US006594968B2

(12) United States Patent
Harris et al.

(10) Patent No.: US 6,594,968 B2
(45) Date of Patent: Jul. 22, 2003

(54) METHOD OF MAKING A FOUNDATION

(75) Inventors: Neil Tracey Harris, St. Austell (GB); Matthew Bristow, St. Austell (GB)

(73) Assignee: Oceans Engineering Limited, Cornwall (GB)

( * ) Notice: Subject to any disclaimer, the term of this patent is extended or adjusted under 35 U.S.C. 154(b) by 0 days.

(21) Appl. No.: 09/766,826

(22) Filed: Jan. 22, 2001

(65) Prior Publication Data

US 2002/0066255 A1 Jun. 6, 2002

(30) Foreign Application Priority Data

Dec. 2, 2000 (GB) ............................................ 0029498

(51) Int. Cl.⁷ ........................... E04B 1/00; E04G 21/00; E04G 23/00
(52) U.S. Cl. ................ 52/741.15; 52/742.14; 52/745.04; 52/745.17; 52/745.12; 52/745.18; 405/229; 405/232; 405/233; 405/236
(58) Field of Search ................ 52/742.14, 742.15, 52/741.11, 741.15, 223.4, 223.5, 169.5, 295, 745.17, 745.12, 745.04, 745.18, 294, 296; 405/229, 232, 257, 233, 236

(56) References Cited

U.S. PATENT DOCUMENTS

| | | | | | |
|---|---|---|---|---|---|
| 4,976,087 A | * | 12/1990 | Pizzino | ...................... | 52/742 |
| 5,437,519 A | * | 8/1995 | Bullivant | ...................... | 405/229 |
| 5,586,417 A | * | 12/1996 | Henderson et al. | ........... | 52/295 |
| 5,623,792 A | * | 4/1997 | Crumpacker | ............... | 52/126.7 |
| 5,806,262 A | * | 9/1998 | Nagle | ........................... | 52/296 |
| 5,826,387 A | * | 10/1998 | Henderson et al. | ........... | 52/295 |
| 6,254,314 B1 | * | 7/2001 | Park et al. | ...................... | 52/301 |
| 6,263,637 B1 | * | 7/2001 | Spene et al. | .............. | 52/745.02 |
| 6,367,214 B1 | * | 4/2002 | Monachino | ................... | 52/247 |

FOREIGN PATENT DOCUMENTS

TW          52-44048     * 10/1975  ............ E02D/29/12

* cited by examiner

*Primary Examiner*—Carl D. Friedman
*Assistant Examiner*—Chi Q Nguyen
(74) *Attorney, Agent, or Firm*—Melvin I. Stoltz

(57) ABSTRACT

An improved method of making a foundation for a wind turbine comprises:
  a) forming a pit,
  b) providing a cylindrical open-bottomed steel can,
  c) lowering the can into the pit,
  d) accurately aligning the steel can,
  e) concreting the steel can in position in the pit, and
  f) back-filling the interior of the can.

12 Claims, 2 Drawing Sheets

METHOD OF MAKING A FOUNDATION

FIELD OF THE INVENTION

This invention relates to a method of making a foundation and is specifically concerned with the making of a foundation for a wind turbine.

A currently accepted method of making a foundation for a wind turbine is described in U.S. Pat. No. 5,586,417, to which reference should be made. The foundation is constructed of cementitious material poured in situ between inner and outer cylindrical corrugated metal pipe shells. The foundation is formed within a ground pit which is externally and internally back-filled.

An anchor ring is embedded in the lower end of the foundation and sets of inner and outer circumferentially spaced bolts have their lower ends attached to the anchor ring and their upper ends projecting outwardly of the top of the foundation. The upper ends of the bolts pass through holes in a base flange of a tubular tower resting on the foundation and nuts are threaded downwardly upon the upper ends of the bolts and against the base flange.

An essential feature of this foundation is that the bolts are all pre-stressed. This type of foundation is accordingly often referred to as a "tensionless" tube.

It is an object of the present invention to provide a method of making a foundation, particularly a foundation for a wind turbine, which is more economical than the method of U.S. Pat. No. 5,586,417.

SUMMARY OF THE INVENTION

According to the present invention there is provided a method of making a foundation, particularly a foundation for a wind turbine, said method comprising:

a) forming a pit, b) providing a cylindrical open-bottomed steel can, c) lowering the can into the pit, d) accurately aligning the steel can, e) concreting the steel can in position in the pit, and f) back-filling the interior of the can.

Concreting of the can in position in the pit is preferably effected in a first stage and a second stage, the first stage involving the introduction of concrete into the bottom of the pit to a depth sufficient to form a concrete layer in the open lower end of the can and around the lower end of the can, and the second stage involving the subsequent introduction of concrete around the can to substantially ground level. The second stage will preferably be carried out at least twenty four hours after the first stage to allow time for setting of the concrete introduced in the first stage.

The open-ended steel can preferably includes a plurality of sections of different wall thickness, with the lowermost section being of the lowest wall thickness and with the upper section of greatest wall thickness. The steel can may, for example, comprise three sections of different wall thickness. For a steel can having a depth of eight metres, there may be an upper section having a depth of 2 metres and a wall thickness of 23 mm., an intermediate section having a depth of 3 metres and a wall thickness of 18 mm., and a lowermost section having a depth of 3 metres and a wall thickness of 16 mm. It will be appreciated that the depths of the sections and the wall thickness can be varied depending on the required parameters for the finished foundation.

The pit is preferably formed by excavation and is preferably of substantially square cross-section. However, as opposed to excavating a pit of substantially square cross-section using a conventional excavating machine, it is possible to drill a circular hole, of greater diameter than the external diameter of the steel can.

Back-filling of the interior of the can may be effected using the as-dug excavated material. Compaction of the as-dug excavated material will not normally be required. Once the interior of the can has been filled to the required level, a layer of concrete is preferably laid on top of the in-fill material.

The can is preferably supported, during lowering thereof, from a three-point levelling support frame.

The upper end of the steel can is provided with fixing means designed to facilitate connection of the structure being supported by the foundation to the steel can. Such fixing means may comprise, for example, an inwardly extending flange at the upper end of the steel can, which flange is formed with a plurality of angularly spaced apertures to receive fixing bolts for connection of the flange at the upper end of the steel can to a corresponding flange at the lower end of the structure.

Other connection means may, of course, be provided, particularly if the structure is a wind turbine. For example, the upper end of the steel can may, when installed, extend above ground level to an extent such as to facilitate welding of the upper end of the steel can to the base of the wind turbine.

The foundation will thus function as a monopile and, in a typical example, the steel can will have a depth of 8 metres and an outside diameter of 3 metres. The pit which is formed to receive the steel can will then be of square configuration with minimum dimensions of 3.3×3.3 metres square and 7.85 metres deep and maximum dimensions of 4×4 metres square and 8 metres deep.

DESCRIPTION OF THE PREFERRED EMBODIMENT

Figure 1:
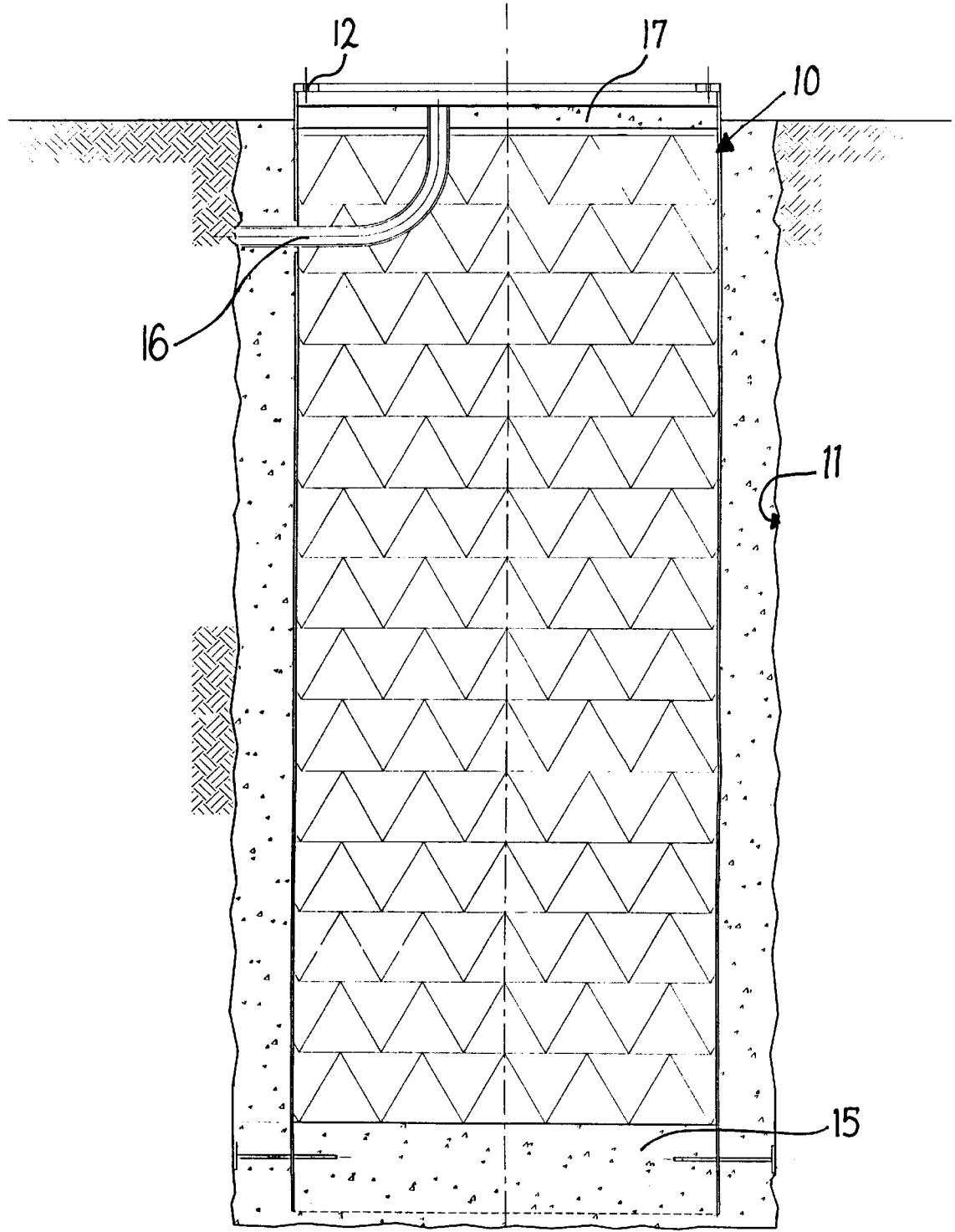
FIG. 1 is a sectional view of a completed monopile foundation.
Figure 2:
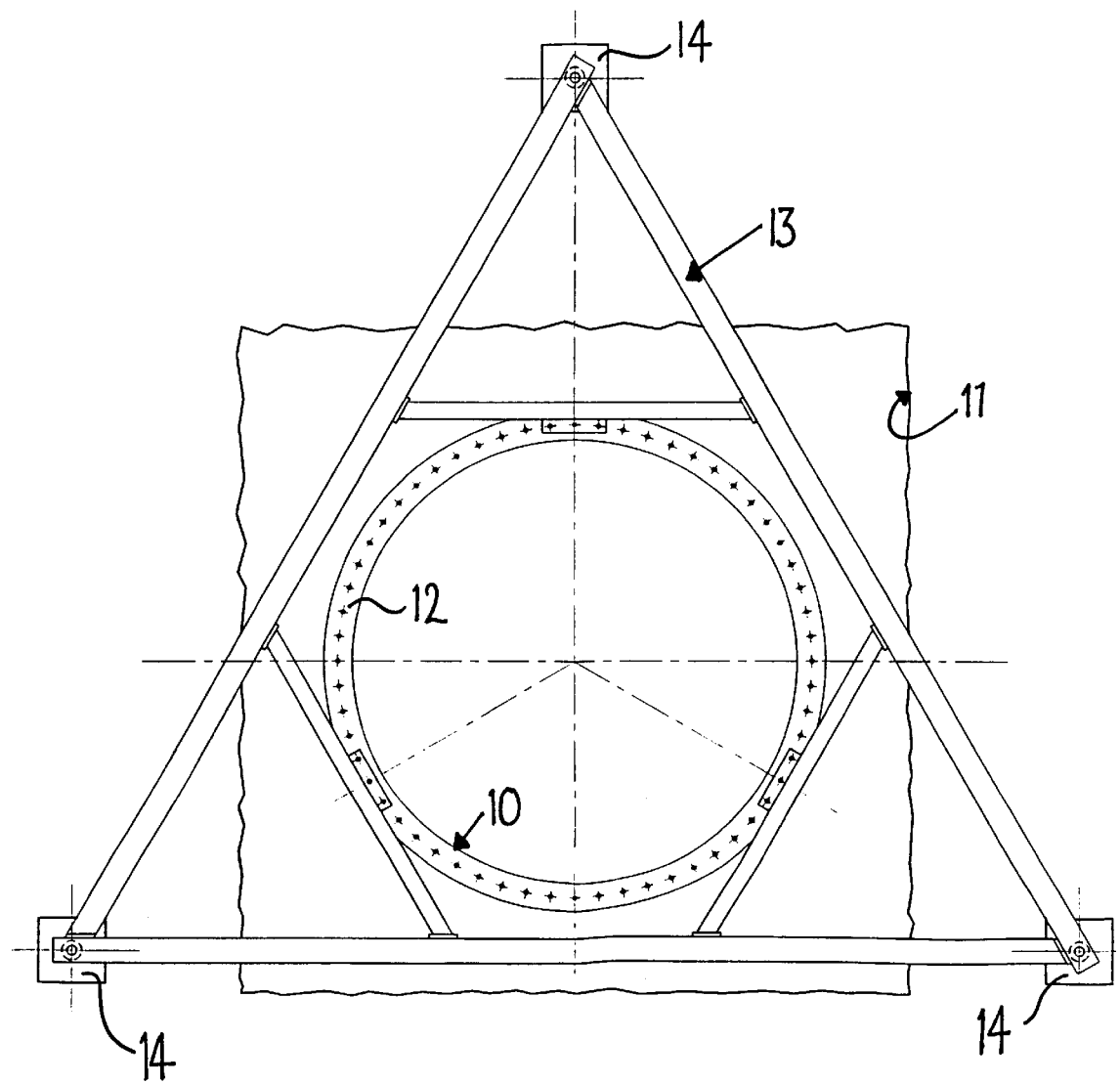
FIG. 2 is a plan view showing a support and levelling frame used in producing the foundation.

FIG. 1 shows a cylindrical steel can 10 installed in a pit 11 ready for attachment of the base of the tower of a wind turbine (not shown) to an internally directed flange 12 at the upper end of the can 10. As can be seen from FIG. 1, the upper end portion of the can 10 is above ground level so that access can readily be obtained to the flange 12 which is formed with a plurality of angularly spaced apertures to enable the flange 12 to be bolted to a corresponding inwardly directed flange or flanges at the base of the tower of the wind turbine. For example, there may be a double flange at the base of the tower with a double row of bolts. Alternatively, the upper end portion of the can 10 may be welded to the base of the tower, the upper end portion of the can 10 then extending above ground level to an extent such as to facilitate welding of the uppermost portion of the can 10 to the base of the tower. The steel can 10 is open at both top and bottom.

The pit 11 is formed by means of an excavator and, to receive a can 10 which has a height of 8 metres and an external diameter of 3 metres, the pit 11 will have a depth which is between 7.85 and 8 metres and will be from 3.3×3.3 metres square to 4×4 metres square. As an alternative to forming the pit 11 by excavation, it may be formed by drilling and will then have a depth within the range indicated above and a diameter within the range of from 3.5 to 4 metres.

The steel can 10 is in the form of a shell of varying thickness, with the thickness of the shell being greatest at the top of the can 10. Thus, for a can 10 having a height of 8 metres, the can 10 may be formed as three interconnected sections, with the uppermost section having a height of 2 metres and a wall thickness of 23 mm., a middle section having a height of 3 metres and a wall thickness of 18 mm., and a lowermost section having a height of 3 metres and a wall thickness of 16 mm.

After the pit 11 has been formed, a three-point levelling support frame 13 is positioned above the open mouth of the pit 11. The frame 13 has three feet 14 which are each positioned at least 1 metre from the adjacent edge of the pit 11 and each foot 14 includes a screw jack and a bearing pad so that the feet 14 can be adjusted independently of one another. At the top of the frame 13, suspension means (not shown) is provided for supporting the steel can 10 during lowering thereof into the pit 11. Such suspension means is of known construction and standard control means is provided for controlling lowering of the steel can 10 into the pit 11.

The steel can 10 is lowered into a position in which the lower edge of the can is spaced a nominal 0.1 metres above the base of the pit 11. Adjustment of the position of the can 10 is then effected to ensure that the central longitudinal axis of the can 10 is accurately aligned with the vertical. Once the alignment of the can 10 has been verified, a layer 15 of C7.5/H7.5 concrete is introduced into the base of the pit 11, such concrete being so introduced that it is situated both within the lower end portion of the can 10 and outside the lower end portion of the can 10. The layer 15 has a minimum depth of 1 metre and is such that the lowermost portion of the steel can 10 is embedded in the concrete layer 15 with the concrete layer 15 extending upwardly from the lower edge of the can 10 by a distance of at least about 0.75 metres.

The initial layer 15 of C7.5/H7.5 concrete is allowed to set for a minimum of twenty four hours before the annular space around the steel can 10 is filled with C7.5/H7.5 concrete to form a concrete sleeve surrounding the can 10 and extending upwardly from the concrete layer 15 to substantially ground level. The interior of the can 10 is back-filled using the as-dug excavated material. Compaction is not normally required.

It is to be noted that there is a 200 mm. diameter hole in the wall of the can 10 about 1 metre from the upper edge of the can 10 and that, before all the concrete has been introduced around the can 10 and before back-filling of the interior of the can 10 has been completed, a cable duct 16 is passed through this hole. The cable duct 16 is for the provision of services to the interior of the turbine.

After the interior of the can 10 has been filled to the required depth with the as-dug excavated material, a nominally 150 mm. thick slab 17 of C25/H25 concrete incorporating a steel mesh is laid on top of the in-fill material. The cable duct 16 passes through the slab 17, which has its upper surface a nominal 160 mm. below the upper edge of the can 10.

The arrangement shown in the drawings is given purely by way of example and many modifications thereof are possible. The foundation loads for the specific construction having the dimensions set out above are as follows:

Moment=14400 kN.

Shear force=305 kN. And

Vertical=866 kN.

Important advantages of the present invention as compared to that disclosed in U.S. Pat. No. 5,586,417 are as follows:

a) reduced overall foundation costs, b) minimum usage of concrete and therefore reduced costs of handling of concrete to (remote) sites, c) it is possible to use low-strength concrete rather than high-strength concrete and therefore obtaining a cost saving, d) off-site pre-fabrication of the monopile steel can provides further cost savings, and e) installation of the foundation involves few elements and no complex procedures, thereby speeding up installation which again leads to reduced costs.

The following details and/or options may be included in the specific method described above depending on the site conditions and/or performance criteria:

a) The use of shear studs, welded seams or any other form of shear connector on the outside of the steel can 10 to improve the shear resistance between the shear can 10 and the concrete sleeve, b) Back-filling of the inside of the steel can 10 with concrete and/or cement-bound hardcore or selected back-fill in lieu of soil, c) The use of a reinforced concrete plug at the base of the steel can 10 and a reinforced concrete slab at the top of the steel can 10 to limit distortion of the steel can 10, lateral deflection of the steel can 10 and stress concentration in the steel can 10, d) The use of flange stiffeners and/or gussets to limit distortion of the steel can 10, lateral deflection of the steel can 10 and stress concentration in the steel can 10, e) The use of compacted hardcore, granular material, selected back-fill, cement-bound hardcore or cement-bound selected backfill around the outside of the steel can 10 to fill the excavation, f) The internal slab 17 may be set lower in the steel can 10 to provide additional space for location of a transformer and/or a control panel and/or other equipment. The floor over the internal slab 17 may be a steel grating or the like, g) The use of a reinforcement in the concrete sleeve around the steel can 10 to control cracking, distribute stresses and the like, and h) The use of a nominal flange at the bottom of the steel can 10 to improve the end bearing resistance.

What is claimed is:

1. A method of making a foundation, particularly a foundation for a wind turbine, said method comprising:

a) forming a pit, b) providing a cylindrical open-bottomed steel can, c) lowering the can into the pit, d) accurately aligning the steel can, e) concreting the steel can in position in the pit by first introducing concrete into the bottom of the pit to a depth sufficient to form a concrete layer in the open lower end of the can and around the lower end of the can, and subsequently introducing concrete around the can to substantially ground level, and f) back-filling the interior of the can.

2. A method as claimed in claim 1, in which concreting of the can in position in the pit is effected in a first stage and a second stage, the first stage involving the introduction of concrete into the bottom of the pit to a depth sufficient to form a concrete layer in the open lower end of the can and around the lower end of the can, and the second stage involving the subsequent introduction of concrete around the can to substantially ground level.

3. A method as claimed in claim 2, in which the second stage is carried out at least twenty four hours after the first stage to allow time for setting of the concrete introduced in the first stage.

4. A method as claimed in claim 1, in which the open-ended steel can includes a plurality of sections of different wall thickness, with the lowermost section being of the lowest wall thickness and with the upper section of greatest wall thickness.

5. A method as claimed in claim 4, in which the steel can comprises three sections of different wall thickness.

6. A method as claimed in claim 1, in which the pit is formed by excavation, and in which back-filling of the interior of the can is effected using the as-dug excavated material.

7. A method as claimed in claim 6, in which, once the interior of the can has been filled to the required level, a layer of concrete is laid on top of the in-fill material.

8. A method as claimed in claim 1, in which the can is supported, during lowering thereof, from a three-point levelling support frame.

9. A method as claimed in claim 1, in which the fixing means comprises an inwardly extending flange at the upper end of the steel can, which flange is formed with a plurality of angularly spaced apertures to receive fixing bolts for connection of the flange at the upper end of the steel can to a corresponding flange at the base of the wind turbine.

10. A method as claimed in claim 1, in which the upper end of the steel can, when installed, extends above ground level to an extent to facilitate welding of the upper end of the steel can to the base of the wind turbine.

11. A method as claimed in claim 1, in which the steel can has a depth of about 8 meters and an outside diameter of about 3 meters and in which the pit which is formed to receive the steel can is of square configuration with minimum dimensions of about 3.3×3.3 meters square and about 7.85 meters deep and maximum dimensions of about 4×4 meters square and about 8 meters deep.

12. A method of making a foundation, particularly a foundation for a wind turbine, said method comprising:
   a) forming a pit,
   b) providing a cylindrical open-bottomed steel can, comprising a plurality of sections of different wall thickness, with the lowermost section being of the lowest wall thickness and with the upper section of greatest wall thickness.
   c) lowering the can into the pit,
   d) accurately aligning the steel can,
   e) concreting the steel can in position in the pit, and
   f) back-filling the interior of the can.

* * * * *